(12) United States Patent
Nagata et al.

(10) Patent No.: US 9,672,433 B2
(45) Date of Patent: Jun. 6, 2017

(54) MULTI-DIRECTIONAL VEHICLE MANEUVERING ASSISTANCE

(71) Applicant: Toyota Motor Engineering & Manufacturing North America, Inc., Erlanger, KY (US)

(72) Inventors: Katsumi Nagata, Foster City, CA (US); Charan Lota, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/542,449

(22) Filed: Nov. 14, 2014

(65) Prior Publication Data
US 2016/0140403 A1    May 19, 2016

(51) Int. Cl.
*G06K 9/00*    (2006.01)
*B60R 1/00*    (2006.01)
(Continued)

(52) U.S. Cl.
CPC .......... *G06K 9/00805* (2013.01); *B60R 1/00* (2013.01); *B60R 1/06* (2013.01); *B60R 1/12* (2013.01);
(Continued)

(58) Field of Classification Search
None
See application file for complete search history.

(56) References Cited

U.S. PATENT DOCUMENTS 5,289,321 A * 2/1994 Secor ............... B60K 35/00
                                                     348/118
5,414,461 A * 5/1995 Kishi ............... B60R 1/00
                                                     345/7
(Continued)

FOREIGN PATENT DOCUMENTS

JP    2004343322 A  * 12/2004
JP    2005324693 A    11/2005
(Continued)

OTHER PUBLICATIONS

Honda Develops New Multi-View Camera System to Provide View of Surrounding Areas to Support Comfortable and Safe Driving; Honda Motor Co., Ltd.; dated Sep. 18, 2008; [Retrieved Aug. 21, 2014]; Retrieved from the Internet: <http://world.honda.com/news/2008/4080918Multi-View-Camera-System/>, 3 pages.
(Continued)

*Primary Examiner* — Tsung-Yin Tsai
(74) *Attorney, Agent, or Firm* — Christopher G. Darrow; Darrow Mustafa PC

(57) ABSTRACT

Arrangements relate to providing multi-directional assistance while maneuvering a vehicle. The vehicle can have an exterior with a first lateral side and a second lateral side. The vehicle can include a side camera provided on one of the first lateral side or the second lateral side. The side camera can be movable between a plurality of facing positions. It can be determined whether a current facing position of the side camera matches a current vehicle movement direction. If it is determined that the current facing position of the side camera does not match the current vehicle movement direction, the facing position of the side camera can be automatically adjusted so that the facing position of the side camera matches the current vehicle movement direction.

20 Claims, 6 Drawing Sheets

(51) Int. Cl.
  *G06K 9/62* (2006.01)
  *B60R 1/06* (2006.01)
  *B60R 1/12* (2006.01)
  *B60R 11/04* (2006.01)

(52) U.S. Cl.
  CPC ............ *B60R 11/04* (2013.01); *G06K 9/6201* (2013.01); *B60R 2001/1253* (2013.01); *B60R 2300/101* (2013.01)

(56) References Cited

U.S. PATENT DOCUMENTS

| | | |
|---|---|---|
| 6,291,906 B1 | 9/2001 | Marcus et al. |
| 6,447,128 B1 | 9/2002 | Lang et al. |
| 6,476,731 B1 * | 11/2002 | Miki ................ B60Q 1/0023 340/435 |
| 6,483,442 B2 | 11/2002 | Shimizu et al. |
| 7,924,506 B2 | 4/2011 | Rieger |
| 8,599,043 B2 | 12/2013 | Kadowaki et al. |
| 8,694,195 B2 | 4/2014 | Lee et al. |
| 2002/0186201 A1 * | 12/2002 | Gutta ................ G08G 1/0965 345/156 |
| 2007/0132567 A1 * | 6/2007 | Schofield ............. B60C 23/00 340/438 |
| 2008/0055411 A1 * | 3/2008 | Lee ..................... B60R 1/00 348/148 |
| 2008/0116680 A1 * | 5/2008 | Mita ............. B60R 21/01538 280/801.1 |
| 2008/0189000 A1 * | 8/2008 | Duong ................... B60T 7/22 701/20 |
| 2010/0182432 A1 | 7/2010 | Augst |
| 2012/0062743 A1 * | 3/2012 | Lynam ................ B60Q 9/005 348/148 |
| 2012/0133768 A1 | 5/2012 | Stephan |
| 2013/0050490 A1 | 2/2013 | Kato |
| 2015/0002954 A1 * | 1/2015 | Lynam ................. B60R 1/082 359/866 |
| 2015/0141043 A1 * | 5/2015 | Abramson ........... G01C 21/34 455/456.1 |
| 2015/0168174 A1 * | 6/2015 | Abramson ......... G01C 21/3697 701/408 |

FOREIGN PATENT DOCUMENTS

| | | |
|---|---|---|
| JP | 04329494 B2 | 9/2009 |
| JP | 2010166196 A | 7/2010 |
| JP | 5187369 B2 | 4/2013 |

OTHER PUBLICATIONS

Re-engineered into a well-rounded sedan; [Retrieved Nov. 13, 2014]; Retrieved from the Internet: <http://www.latimes.com/business/autos/lat-the-2013-honda-accord-20121003-006-photo.html>, 2 pages.

Car side mirror camera mini size and high definition; [Retrieved Nov. 13, 2014]; Retrieved from the Internet: <http://www.alibaba.com/product-detail/car-side-mirror-camera-mini-size_1281900302.html>, 10 pages.

Honda Develops New Multi-View Vehicle Camera System to Provide View of Surrounding Areas; dated Sep. 18, 2008; [Retrieved Aug. 21, 2014]; Retrieved from the Internet: <http://phys.org/news140974597.html>, 10 pages.

* cited by examiner

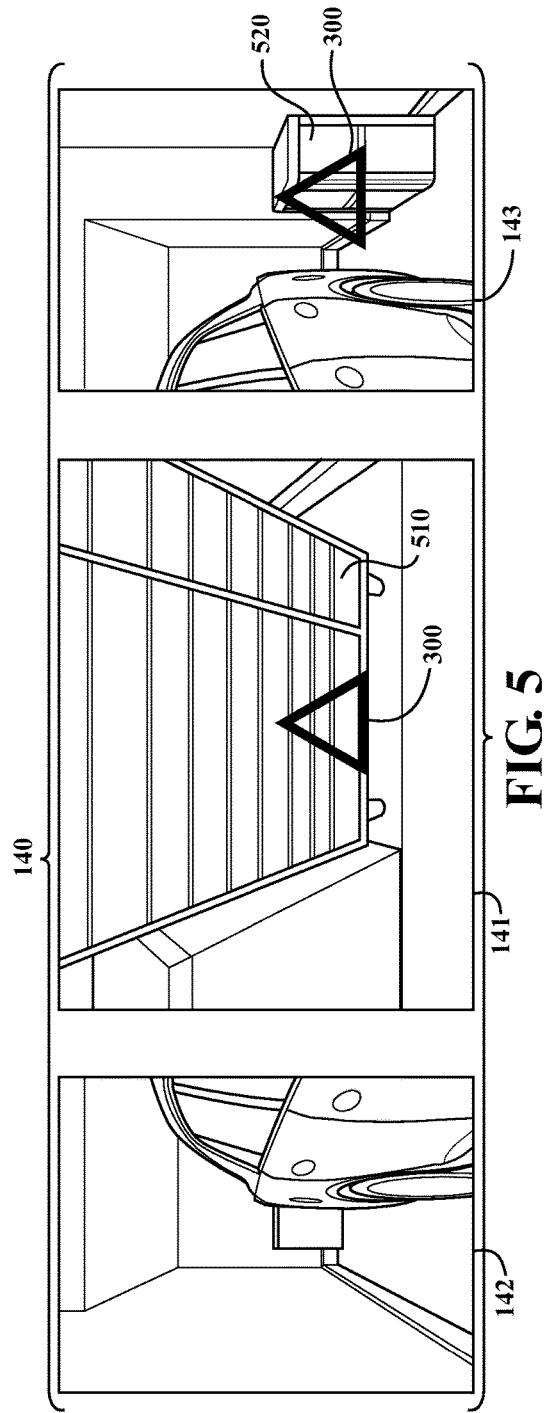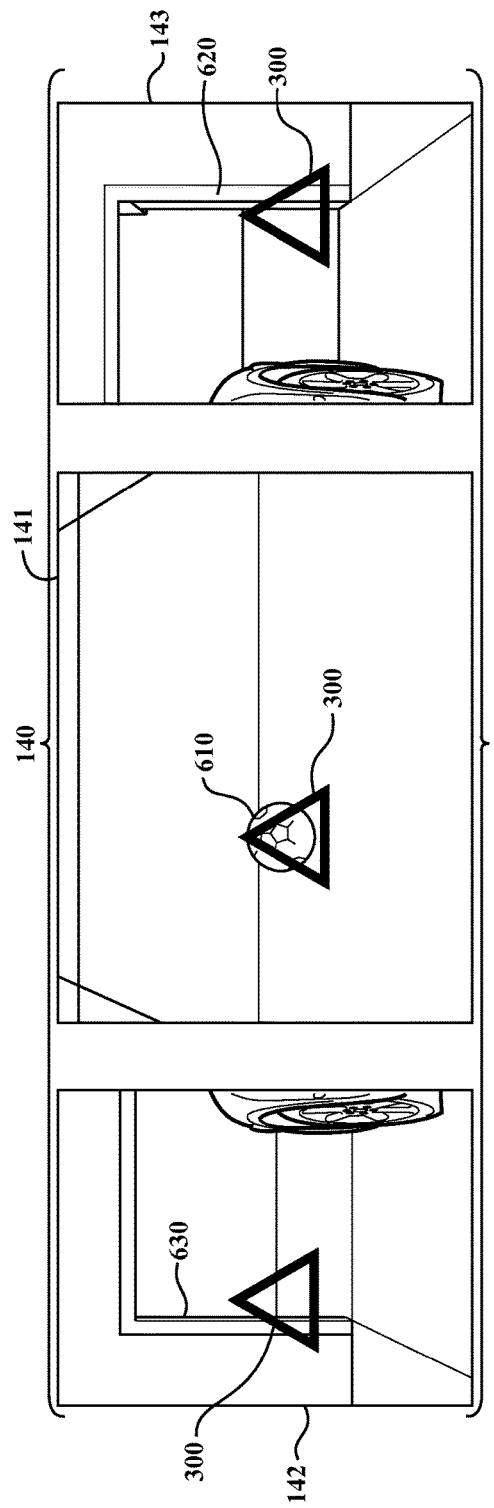

MULTI-DIRECTIONAL VEHICLE MANEUVERING ASSISTANCE

FIELD

The subject matter described herein relates in general to vehicles and, more particularly, to the maneuvering of vehicles at low speeds.

BACKGROUND

Some vehicles include a reverse parking assistance system in which video or image data from the area behind the vehicle is captured by a rear-facing camera system. Such a camera system typically includes a single camera. The video or image data captured by the camera is presented on a display located in a forward portion of the vehicle, such as in a dashboard or an instrument panel. Some reverse parking assistance systems also include sensors operable to detect objects located behind the vehicle and the proximity of such objects to the vehicle.

SUMMARY

In one respect, the present disclosure is directed to a multi-directional maneuvering assistance method for a vehicle. The vehicle can have an exterior with a first lateral side and a second lateral side. The vehicle can include a side camera. The side camera can be provided on the first lateral side or the second lateral side of the vehicle. The side camera can be movable between a plurality of facing positions.

The method can include determining whether a current facing position of the side camera matches a current vehicle movement direction. The method can also include, responsive to determining that the current facing position of the side camera does not match the current vehicle movement direction, automatically adjusting the facing position of the side camera so that the facing position of the side camera matches the current vehicle movement direction.

In another respect, the present disclosure is directed to a vehicle with a multi-directional maneuvering assistance system. The vehicle can have an exterior with a first lateral side and a second lateral side. A side camera can be provided on the first lateral side or the second lateral side of the vehicle. The side camera can have a plurality of facing positions.

The vehicle can additionally include a processor. The processor can be located onboard the vehicle. The processor can be programmed to initiate executable operations. The executable operations can include determining whether a current facing position of the side camera matches a current vehicle movement direction. The executable operations can further include, responsive to determining that the current facing position of the side camera does not match the current vehicle movement direction automatically adjusting the facing position of the side camera so that the facing position of the side camera matches the current vehicle movement direction.

In yet another respect, the present disclosure is directed to a computer program product for providing multi-directional maneuvering assistance for a vehicle. The vehicle can have an exterior with a first lateral side and a second lateral side. The vehicle can include a side camera. The side camera can be provided on one of the first lateral side and the second lateral side of the vehicle. The side camera can be movable between a plurality of facing positions.

The computer program product includes a computer readable storage medium having program code embodied therewith. The program code is executable by a processor to perform a method. The method can include determining whether a current facing position of the side camera matches a current vehicle movement direction. The method can also include, responsive to determining that the current facing position of the side camera does not match the current vehicle movement direction, automatically adjusting the facing position of the side camera so that the facing position of the side camera matches the current vehicle movement direction.

BRIEF DESCRIPTION OF THE DRAWINGS

FIG. 5 is an example of a forward display, presenting visual data captured by a rear camera and rear-facing side cameras.

FIG. 6 is an example of the forward display, presenting visual data captured by a front camera and front-facing side cameras.

DETAILED DESCRIPTION

Figure 1:
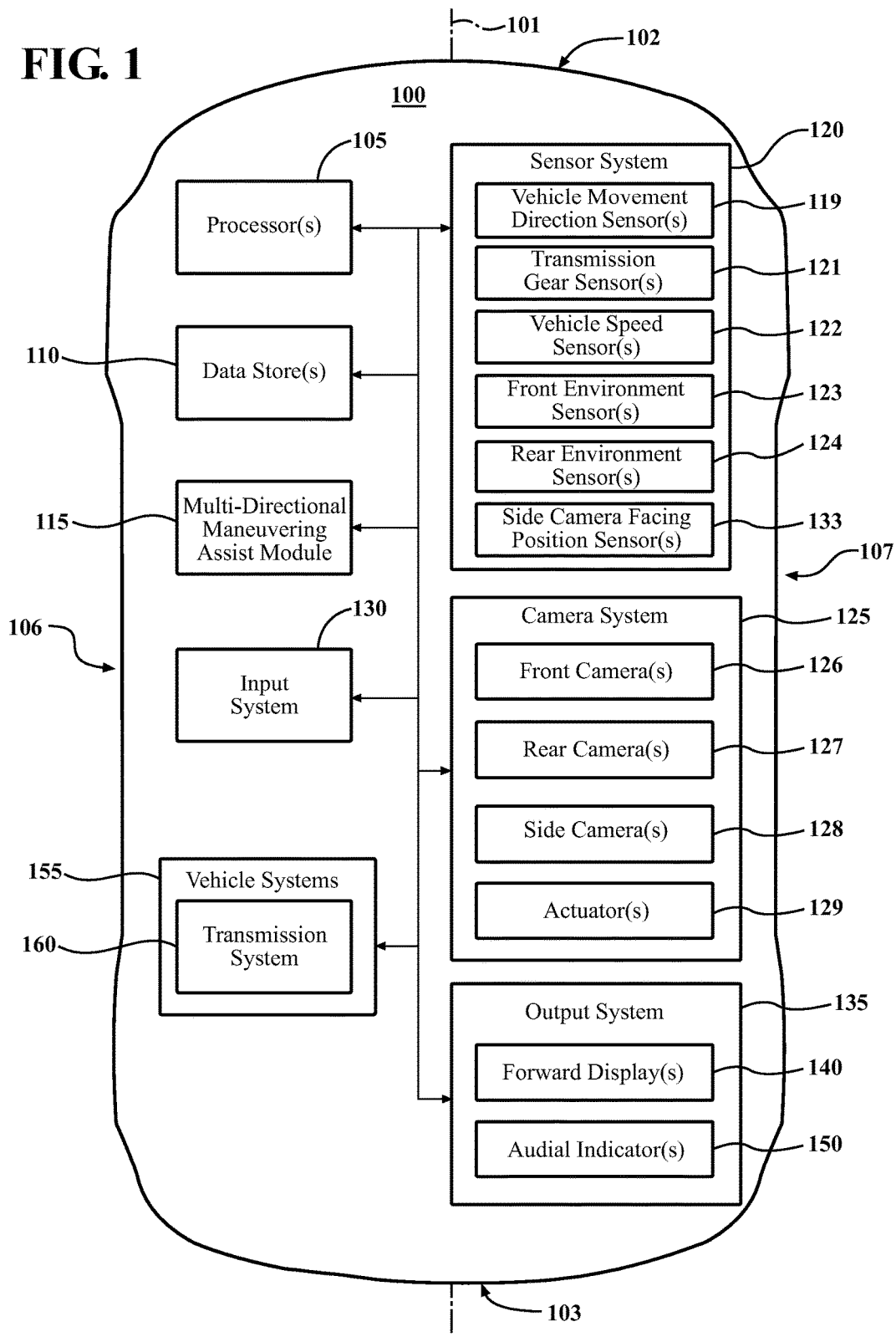
FIG. 1 is an example of a vehicle having a multi-directional maneuvering assistance system.

This detailed description relates to assisting a driver during low-speed maneuvering of a vehicle, such as when a driver is forward or reverse parking a vehicle, low-speed forward or reverse movement of the vehicle, or even when a vehicle is parked. Arrangements described herein relate to the automatic adjusting the facing position of one or more side cameras of the vehicle to match the travel direction of the vehicle based on the current direction of movement of the vehicle. The present detailed description relates to systems, methods and computer program products that incorporate such features. In at least some instances, such systems, methods and computer program products can, among other things, assist a driver by providing information about the surrounding environment of the vehicle to the driver.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

The vehicle 100 can have an associated longitudinal axis 101, that is, the central axis of the vehicle 100. The vehicle 100 can have an associated longitudinal direction. In this context, "longitudinal direction" is any direction that is substantially parallel to and/or co-linear with the longitudinal axis 101. The vehicle 100 can have a front end 102 and a back end 103. The vehicle 100 can have a first lateral side 106 and an opposite second lateral side 107. In some vehicles, the first lateral side 106 can be the driver side of the vehicle 100, and the second lateral side 107 can be the passenger side of the vehicle 100. In other vehicles, the first lateral side 106 can be the passenger side of the vehicle 100, and the second lateral side 107 can be the driver side of the vehicle 100.

Figure 2:
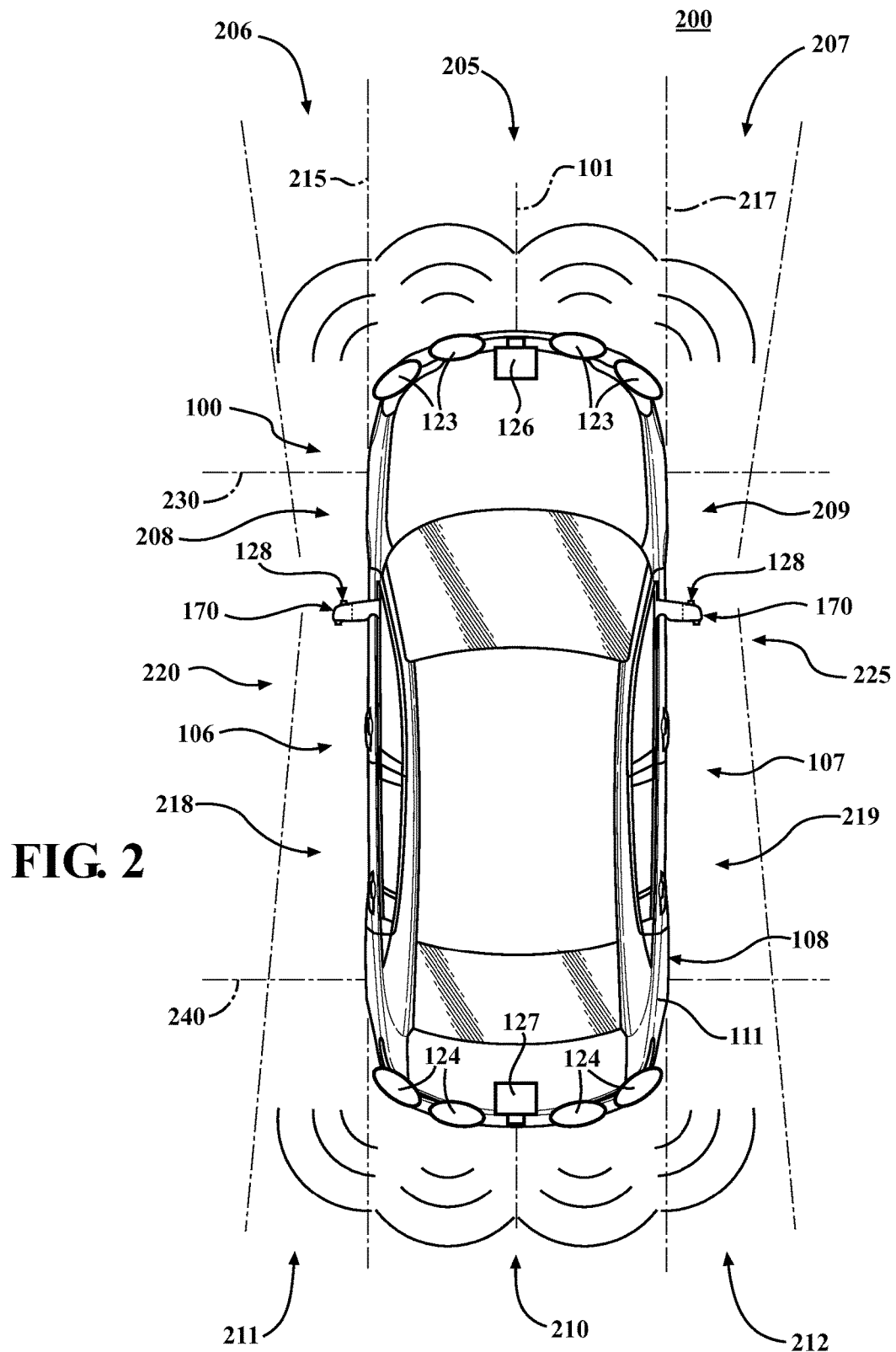
FIG. 2 is an example of a vehicle in an environment, the vehicle including a first side camera located on a first side of the vehicle and a second side camera located on a second side of the vehicle.

Referring to FIG. 2, the vehicle 100 can have an exterior 108 and a main body 111. The vehicle 100 can include one or more wing mirrors 170. "Wing mirror" is defined as a mirror located on the exterior of a vehicle to assist a driver to see side areas of the vehicle and/or other areas. Examples of wing mirrors include fender mirrors, door mirrors and side mirrors, just to name a few possibilities. Arrangements presented herein will be shown and described in connection with side mirrors; however, it will be understood that arrangements are not limited to the wing mirror being a side mirror.

In one or more arrangements, the vehicle 100 can have two wing mirrors 170. For instance, there can be a wing mirror 170 located on the first lateral side 106 of the vehicle 100, and there can be a wing mirror 170 located on the second lateral side 107 of the vehicle 100. The wing mirrors 170 can project laterally from the main body 111 of the vehicle 100.

Figure 3:
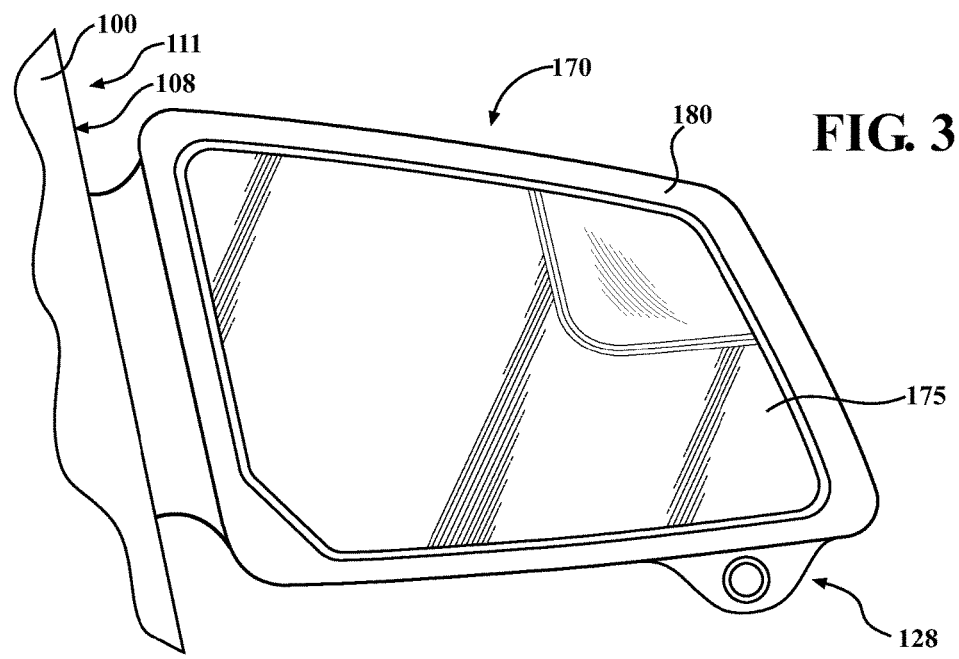
FIG. 3 is an example of a wing mirror, showing a side camera mounted thereon.

FIG. 3 shows an example of a wing mirror 170. The wing mirror 170 can include a mirror element 175 and a housing 180. In some arrangements, one or more portions of the wing mirror 170 (e.g. the mirror element 175) can be adjustable. Such adjustment can be achieved in any suitable manner, such as manually, automatically or by selective remote control by a vehicle occupant (e.g. a driver or a passenger). Further, the wing mirror 170 can be movable with respect to the main body 111 of the vehicle 100. For instance, the wing mirror 170 can be pivotable with respect to the main body 111 of the vehicle 100.

The vehicle 100 can include various elements. Some of the possible elements are shown in FIG. 1 will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. It should be appreciated that although particular elements are separately defined, each or any of the elements or portions thereof may be otherwise combined or segregated via hardware and/or software.

Further, while the various elements are shown as being located within the vehicle 100 in FIG. 1, it will be understood that one or more of these elements can be located external to vehicle 100. Further, the elements shown may be physically separated by any distance, including large distances.

The vehicle 100 can include one or more processors 105. "Processor" means any component or group of components that are configured to execute any of the processes described herein or any form of instructions to carry out such processes or cause such processes to be performed. The processor 105 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The processor 105 can include at least one hardware circuit (e.g., an integrated circuit) configured to carry out instructions contained in program code. In arrangements in which there is a plurality of processors 105, such processors can work independently from each other or one or more processors can work in combination with each other. In one or more arrangements, the processor 105 can be a main processor of the vehicle 100. For instance, the processor 105 can be an engine control unit.

The vehicle 100 can include one or more data stores 110 for storing one or more types of data. The data store 110 can include volatile and/or non-volatile memory. Examples of suitable data stores 110 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 110 can be operatively connected to the processor 105 for use thereby. The term "operatively connected," as used throughout this description, can include direct or indirect connections, including connections without direct physical contact.

The vehicle 100 can include a multi-directional maneuvering assist module 115. As used herein, "multi-directional" means two or more directions. "Maneuvering" means any movement of the vehicle, including, for example, reverse parking, forward parking, and/or low speed forward or reverse operation of the vehicle. "Maneuvering" can also include instances in which the vehicle is stopped or parked. The multi-directional maneuvering assist module 115 can be implemented as computer readable program code that, when executed by a processor, implement the various processes described herein. The multi-directional maneuvering assist module 115 and/or the data store 110 can be components of the processor 105. Alternatively, the multi-directional maneuvering assist module 115 and/or the data store 110 can be executed on and/or distributed among other processing systems to which the processor 105 is operatively connected.

The multi-directional maneuvering assist module 115 can include instructions (e.g., program logic) executable by the processor 105. Such instructions can include instructions to execute various vehicle functions and/or to transmit data to, receive data from, interact with, and/or control the vehicle 100 or one or more elements, components, devices and/or systems thereof (e.g. a sensor system 120 and/or one or more of vehicle systems 155). Alternatively or in addition, the data store 110 may contain instructions.

The vehicle 100 can include a sensor system 120. The sensor system 120 can include one or more sensors. "Sensor" means any device, component and/or system that can detect, determine, assess, measure, quantify and/or sense something, directly or indirectly. The one or more sensors can be configured to detect, determine, assess, measure, quantify and/or sense information in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other or one or more of the sensors can work in combination with each other. The sensor system 120 and/or one or more sensors of the sensor system 120 can be operatively connected to the processor 105, the data store 110, the multi-directional maneuvering assist module 115 and/or another element, system and/or component of the vehicle 100. The processor 105, the multi-directional maneuvering assist module 115 and/or other element, system and/or component of the vehicle 100 can process data or information received from the one or more sensors to determine something.

The sensor system 120 can include any suitable type of sensor. For instance, the sensor system 120 can include one or more sensors configured to detect, determine, assess, measure, quantify and/or sense, directly or indirectly, information about the vehicle 100. As an example, the sensor system 120 can include one or more vehicle movement direction sensors 119. The one or more vehicle movement direction sensors 119 can be configured to detect, determine, assess, measure, quantify and/or sense, directly or indirectly, information about the direction in which the vehicle is moving. As another example, the sensor system 120 can include one or more transmission gear sensors 121. The one or more transmission gear sensors 121 can be configured to detect, determine, assess, measure, quantify and/or sense, directly or indirectly, information about which gear of the vehicle's transmission system 160 is currently selected.

In some arrangements, the sensor system 120 can include one or more vehicle speed sensors 122. More particularly, the one or more vehicle speed sensors 122 can be configured to detect, determine, assess, measure, quantify and/or sense, directly or indirectly, a current speed of the vehicle 100. As an example, the one or more vehicle speed sensors 122 can include a speedometer.

In one or more arrangements, the sensor system 120 can include one or more sensors configured to detect, determine, assess, measure, quantify and/or sense, directly or indirectly, information about an environment in which the vehicle 100 is located, including the presence of and/or information about objects in the environment. As an example, the sensor system 120 can include one or more front environment sensors 123 and/or one or more rear environment sensors 124. The one or more front environment sensors 123 can be configured to detect, determine, assess, measure, quantify and/or sense, directly or indirectly, the presence of one or more objects in a forward environment of the vehicle 100, the position of the detected one or more objects and/or the distance between the detected one or more objects and the vehicle 100 in one or more directions (e.g. in the longitudinal direction, a lateral direction and/or other direction(s)). The one or more rear environment sensors 124 can be configured to detect, determine, assess, measure, quantify and/or sense, directly or indirectly, the presence of one or more objects in a rear environment of the vehicle 100, the position of the detected one or more objects and/or the distance between the detected one or more objects and the vehicle 100. The detected objects may be stationary and/or non-stationary objects.

FIG. 2 shows an example of the vehicle 100 in an environment 200. The environment 200 includes a forward environment 205 and a rear environment 210. As used herein, "forward environment" means an area located in front of the vehicle 100. In one or more arrangements, the forward environment 205 of the vehicle 100 can be the area located forward of a substantially vertical plane that passes through a rotational axis 230 of the front wheels (not shown) of the vehicle 100. The substantially vertical plane can also be substantially orthogonal to the longitudinal axis 101 of the vehicle 100. In one or more arrangements, the forward environment 205 of the vehicle 100 can be the area located forward of a substantially vertical plane that passes through a forward-most portion of the vehicle 100 in the longitudinal direction of the vehicle 100. The substantially vertical plane can also be substantially orthogonal to the longitudinal axis 101 of the vehicle 100.

As used herein, "rear environment" means an area located behind the vehicle 100. In one or more arrangements, the rear environment 210 of the vehicle 100 can be the area located behind a substantially vertical plane that passes through a rotational axis 240 of the rear wheels (not shown) of the vehicle 100. The substantially vertical plane can also be substantially orthogonal to the longitudinal axis 101 of the vehicle 100. In one or more arrangements, the rear environment 210 of the vehicle 100 can be the area located behind a substantially vertical plane that passes through a rearmost point of the vehicle 100 in the longitudinal direction of the vehicle 100. The substantially vertical plane can also be substantially orthogonal to the longitudinal axis 101 of the vehicle 100.

Various examples of the front environment sensors 123 and/or the rear environment sensors 124 will be described herein. However, it will be understood that the embodiments are not limited to the particular sensors described. In one or more arrangements, one or more of the front environment sensors 123 and/or one or more of the rear environment sensors 124 can use at least in part radio signals (e.g. RADAR based sensors). The one or more radio-based sensors can be configured to detect, determine, assess, measure, quantify and/or sense, directly or indirectly, the presence of one or more objects in the forward and/or rear environment 205, 210 of the vehicle 100, the position of each detected object relative to the vehicle 100 and/or the distance between each detected object and the vehicle 100 in one or more directions (e.g. in the longitudinal direction, a lateral direction and/or other direction(s)).

In one or more arrangements, one or more of the front environment sensors 123 and/or one or more of the rear environment sensors 124 can use at least in part lasers. For instance, one or more of the front environment sensors 123 and/or one or more of the rear environment sensors 124 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, measure, quantify and/or sense, directly or indirectly, the presence of one or more objects in the forward and/or rear environment 205, 210 of the vehicle 100, the position of each detected object relative to the vehicle 100 and/or the distance between each detected object and the vehicle 100 in one or more directions (e.g. in the longitudinal direction, a lateral direction and/or other direction(s)).

In one or more arrangements, one or more of the front environment sensors 123 and/or one or more of the rear environment sensors 124 can use at least in part ultrasound. Such sensors can include an ultrasound source configured to emit ultrasonic signals and a detector configured to detect reflections of the ultrasonic signal. The one or more ultrasound-based front and/or rear environment sensors 123, 124 can be configured to detect, determine, assess, measure, quantify and/or sense, directly or indirectly, the presence of one or more objects in the forward and/or rear environment 205, 210 of the vehicle 100, the position of each detected object relative to the vehicle 100 and/or the distance between each detected object and the vehicle 100 in one or more directions (e.g. in the longitudinal direction, a lateral direction and/or other direction(s)). Such detecting can be based on a characteristic (e.g. the intensity) of a reflected ultrasonic signal.

In some arrangements, the sensor system 120, the processor 105, and/or the multi-directional maneuvering assist module 115 can be configured to detect, determine, assess, measure, quantify and/or sense, directly or indirectly, one or more aspects, characteristics and/or properties of a detected object. For example, the sensor system 120, the processor 105, and/or the multi-directional maneuvering assist module 115 can be configured to detect, determine, assess, measure, quantify and/or sense, directly or indirectly, the size, relative size, length, width, height, a dimension, the material and/or a material property of a detected object.

Alternatively or in addition to the above, the sensor system 120 can include other types of sensors. The processor 105 can be operable to control movements of one or more of the sensors of the sensor system 120. It should be noted that any of the sensors described herein can be provided in any suitable location with respect to the vehicle 100. For instance, one or more sensors can be located within the vehicle 100 and/or one or more sensors can be located on or exposed to the exterior of the vehicle 100.

The vehicle 100 can include a camera system 125. The camera system 125 can include a plurality of cameras. "Camera" is defined as any device, component, and/or system that can capture visual data. "Visual data" includes video and/or image information/data. Each camera of the camera system 125 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images.

The camera system 125 can include one or more front cameras 126, one or more rear cameras 127, and/or one or more side cameras 128. Each of these cameras will be described in turn below.

"Front camera" means a camera that is oriented, positioned, configured, operable and/or arranged to capture visual data from at least a portion of the forward environment 205 of the vehicle 100. The front camera 126 can be located in any suitable portion of the vehicle 100. In one or more arrangements, the front camera 126 can be located in a central region of the vehicle 100, as is shown in FIG. 2. The front camera 126 can be operable to capture visual data from at least a central portion of the forward environment 205 of the vehicle 100. The front camera 126 can have an associated optical axis. In one or more arrangements, the optical axis of the front camera 126 can be substantially parallel to the longitudinal axis 101 of the vehicle 100.

"Rear camera" means a camera that is oriented, positioned, configured, operable and/or arranged to capture visual data from at least a portion of the rear environment 210 of the vehicle 100. The rear camera 127 can be located in any suitable portion of the vehicle 100. In one or more arrangements, the rear camera 127 can be located in a central region of the vehicle 100, as is shown in FIG. 2. The rear camera 127 can be operable to capture visual data from at least a central portion of the rear environment 210 of the vehicle 100. The rear camera 127 can have an associated optical axis. In one or more arrangements, the optical axis of the front camera 126 can be substantially coaxial with the optical axis of the rear camera 127. However, in other arrangements, the optical axis of the front camera 126 can be non-coaxial with the optical axis of the rear camera 127. In one or more arrangements, the optical axis of the rear camera 127 can be substantially parallel to the longitudinal axis 101 of the vehicle 100.

"Side camera" means a camera that is oriented, positioned, configured, operable and/or arranged to capture visual data from at least a portion of a forward side environment or a rear side environment of the vehicle 100. In some instances, a portion of the visual data captured by the side camera 128 can overlap a portion of the visual data captured by the front camera 126 and/or the rear camera 127. However, in other instances, the visual data captured by the side camera 128 may not overlap the visual data captured by the front camera 126 and/or the rear camera 127.

"Forward side environment" is a portion of the forward environment 205 that is located laterally outside of a lateral boundary of the vehicle 100. The forward side environment can include a left forward side environment 206 and a right forward side environment 207. The left forward side environment 206 can be a portion of the forward environment 205 that is located laterally outside of a left side boundary 215. The right forward side environment 207 can include a portion of the forward environment 205 that is located laterally outside of a right side boundary 217. The left forward side environment 206 can include a portion of the vehicle 100, such as at least a portion of the first lateral side 106. Alternatively or in addition, the right forward side environment 207 can include a portion of the vehicle 100, such as at least a portion of the second lateral side 107.

It should be noted that the forward side environment can also include at least a portion of an area located between the side camera 128 and the forward environment 205. For instance, the left forward side environment 206 can include an area 208 between the side camera 128 and the forward environment 205. Similarly, the right forward side environment 207 can include an area 209 between the side camera 128 and the forward environment 205.

"Rear side environment" is a portion of the rear environment 210 that is located laterally outside of a lateral boundary of the vehicle 100. The rear side environment can include a left rear side environment 211 and a right rear side environment 212. The left rear side environment 211 can be a portion of the rear environment 210 that is located laterally outside of the left side boundary 215. The right rear side environment 212 can be the portion of the rear environment 210 that is located laterally outside of the right side boundary 217. The left rear side environment 211 can include a portion of the vehicle 100, such as at least a portion of the first lateral side 106. Alternatively or in addition, the right rear side environment 212 can include a portion of the vehicle 100, such as at least a portion of the second lateral side 107.

It should be noted that the rear side environment can also include at least a portion of an area located between the side camera 128 and the rear environment 210. For instance, the left rear side environment 211 can include an area 218 between the side camera 128 and the rear environment 210. Similarly, the right rear side environment 212 can include an area 219 between the side camera 128 and the rear environment 210.

The left side boundary 215 can be defined in any suitable manner. In one or more arrangements, the left side boundary 215 can be defined by a substantially vertical plane extending substantially in the longitudinal direction and passing through at least one left side surface of the exterior 108 of the main body 111 of the vehicle 100, as is shown in FIG. 2. In one or more arrangements, the left side boundary 215 can be defined by a substantially vertical plane extending substantially in the longitudinal direction and passing through an inner side of the left side wheels or tires (not shown) of the vehicle 100. In one or more arrangements, the left side boundary 215 can be defined by a substantially vertical plane extending substantially in the longitudinal direction and passing through a center portion of the left side wheels or tires (not shown) of the vehicle 100. In one or more arrangements, the left side boundary 215 can be defined by a substantially vertical plane extending substantially in the longitudinal direction and passing through an outer side of the left side wheels or tires (not shown) of the vehicle 100.

The right side boundary 217 can be defined in any suitable manner. In one or more arrangements, the right side boundary 217 can be defined by a substantially vertical plane extending substantially in the longitudinal direction and passing through at least one right side surface of the exterior 108 of the main body 111 of the vehicle 100, as is shown in FIG. 2. In one or more arrangements, the right side boundary 217 can be defined by a substantially vertical plane extending substantially in the longitudinal direction and passing through an inner side of the right side wheels or tires (not shown) of the vehicle 100. In one or more arrangements, the right side boundary 217 can be defined by a substantially vertical plane extending substantially in the longitudinal direction and passing through a center portion of the right side wheels or tires (not shown) of the vehicle 100. In one or more arrangements, the right side boundary 217 can be defined by a substantially vertical plane extending substantially in the longitudinal direction and passing through an outer side of the right side wheels or tires (not shown) of the vehicle 100.

The one or more side cameras 128 can be configured to be multi-directional. In this respect, "multi-directional" means that the side camera 128 is configured to selectively capture visual data from at least a portion of the forward side environment of the vehicle 100 or at least a portion of the rear side environment of the vehicle 100.

The one or more side cameras 128 can be configured to be multi-directional in any suitable manner. For instance, in one or more arrangements, the one or more side cameras 128 can be movable to permit visual data to be captured from the forward side environment and rear side environment. For example, one or more side cameras 128 can be selectively movable to permit visual data to be captured from the left forward side environment 206 and the left rear side environment 211. As another example, one or more side cameras 128 can be selectively movable to permit visual data to be captured from the right forward side environment 207 and the right rear side environment 212.

The side camera 128 can be movable between a plurality of facing positions. The facing positions can include one or more forward facing positions and one or more rear facing positions. With respect to the side camera 128, a "forward facing position" means that the side camera 128 is oriented, positioned, configured, operable and/or arranged to allow visual data to be captured from at least a portion of the forward side environment of the vehicle 100. Likewise, with respect to the side camera 128, a "rear facing position" is a camera means that the side camera 128 is oriented, positioned, configured, operable and/or arranged to allow visual data to be captured from at least a portion of the rear side environment of the vehicle 100. The one or more side cameras 128 can be selectively movable between at least a first position and a second position. The first position can be a forward facing position, and the second position can be a rear facing position.

The facing position of the side camera 128 can be determined in any suitable manner. As an example, in some arrangements, the sensor system 120 can include one or more side camera facing position sensors 133. More particularly, the one or more side camera facing position sensors 133 can be configured to detect, determine, assess, measure, quantify and/or sense, directly or indirectly, a current facing position of one or more side cameras 128 of the vehicle 100.

While arrangements described herein will be directed to one or more side cameras 128 that are selectively movable between a first position and a second position, it will be understood that, in some implementations, there can be other positions. Such other positions can include other portions of the rear and forward side environments 206, 207, 211, 212 of the vehicle 100.

In one or more arrangements, one or more of the side cameras 128 can be movable to a third position. The third position can be a lateral facing position. In the third position, the one or more side cameras 128 can be oriented, positioned, configured, operable and/or arranged to allow visual data to be captured from at least a portion of a lateral side environment 220, 225 of the vehicle 100. In such case, the side camera 128 can be positioned so that the optical axis of the side camera 128 is oriented transverse to the longitudinal axis 101 of the vehicle 100. More particularly, the optical axis of the side camera 128 can be substantially orthogonal to the longitudinal axis 101 of the vehicle 100. In one or more arrangements, one or more side cameras 128 can be moved into the third position when the gear selection of the transmission system 160 of the vehicle 100 is park. In this way, a driver and/or other vehicle occupant may be able to view visual data of the lateral side environment 220, 225 of the vehicle 100 so as to be aware of any potential hazards when opening a door of the vehicle 100 or exiting the vehicle 100.

Figure 4:
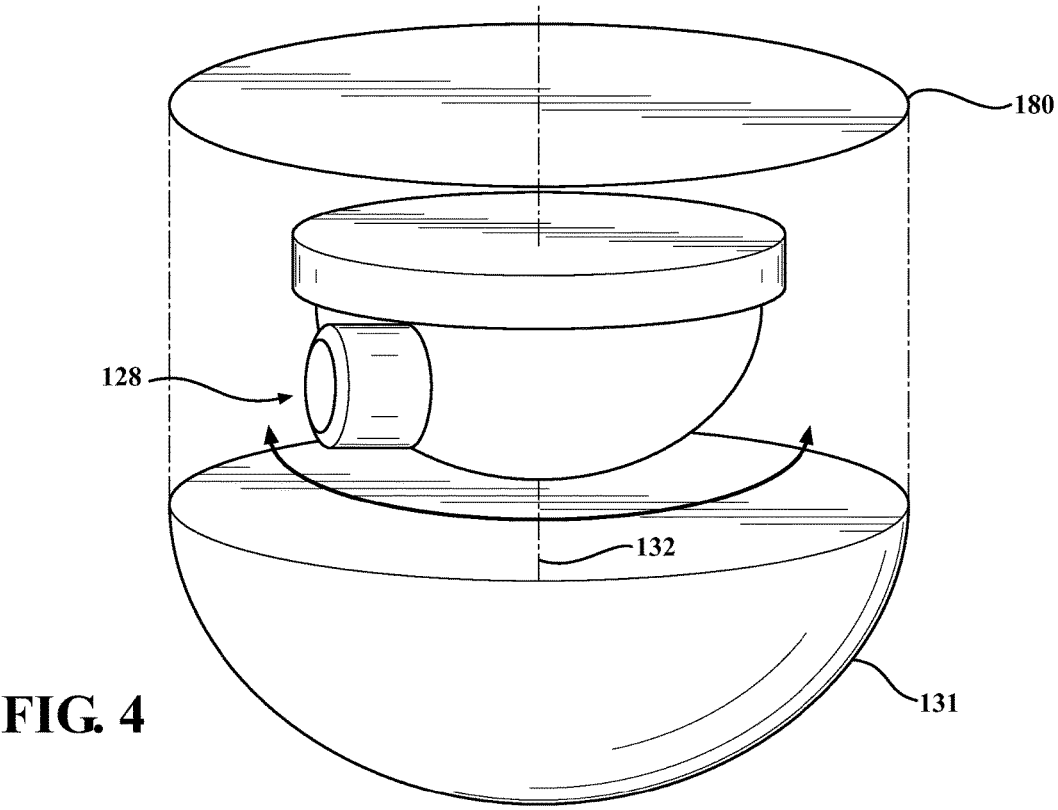
FIG. 4 is an exploded view of the side camera of FIG. 3.

The one or more side cameras 128 can be selectively movable in any suitable manner. For instance, in one arrangement, the one or more side cameras 128 can be rotatable about one or more axes of rotation. FIGS. 3-4 show an example in which the side camera 128 can be rotatable about an axis of rotation 132. FIG. 4 shows an example in which the axis of rotation 132 is substantially vertical. However, it will be understood that arrangements are not limited in this respect. Indeed, in some arrangements, the axis of rotation 132 can be substantially horizontal. In still other arrangements, the axis of rotation 132 can be at any suitable orientation between horizontal and vertical. Further, in some arrangements, one or more of the side cameras 128 can be rotatable about a plurality of axes of rotation.

It will be understood that rotation is only one manner in which the side cameras 128 can be moved. In one or more arrangements, the one or more side cameras 128 can be pivotable. In one or more arrangements, the one or more side cameras 128 can have a substantially hemi-spherically range of motion. In one or more arrangements, the one or more side cameras 128 can have a substantially spherically range of motion. In one or more arrangements, one or more of the side cameras 128 can, alternatively or in addition to any of the above described manners of movement, be moved in a linear motion.

In one or more arrangements, the vehicle 100 can include one or more actuators 129 (FIG. 1). An "actuators" is any element or combination of elements operable to modify, adjust and/or alter one or more cameras of the camera system 125 and/or one or more of the vehicle systems 155 or components thereof responsive to receiving signals or other inputs from the processor 105 and/or the multi-directional maneuvering assist module 115. Any suitable actuator can be used. For instance, the one or more actuators 129 can include motors, pneumatic actuators, hydraulic pistons, relays, solenoids, and/or piezoelectric actuators, just to name a few possibilities.

In one or more arrangements in which a side camera 128 is provided on the first lateral side 106 of the vehicle 100 and a side camera 128 is provided on the second lateral side 107 of the vehicle 100, the movement of the side cameras 128 between facing positions (e.g. between a rear facing position and a forward facing position) can be performed independently of each other. Alternatively, the movement of the side cameras 128 between facing positions can be performed in a coordinated manner. For example, the side cameras 128 can be moved substantially simultaneously into the same facing position.

Further, it will be appreciated that, in some arrangements, the facing position of one or more side cameras 128 may be fixed. Thus, there can be a forward facing side camera 128 for the forward side environment and a rear facing side camera 128 for the respective rear side environment. In one or more of such arrangements, the forward facing side camera 128 and the rear facing side camera 128 may share one or more elements in common and/or can be provided in a single housing. In one or more of such arrangements, an optical axis of the forward facing side camera 128 can be substantially aligned with an optical axis of the rear facing side camera 128. In one or more of such arrangements, the optical axis of the front facing side camera 128 may be offset from the optical axis of the rear facing side camera 128. Visual data can be captured of the forward side environment or the rear side environment by selectively activating the forward facing side camera 128 or the rear facing side camera 128.

The side camera 128 can be provided in any suitable location on the vehicle 100. For instance, the side camera 128 can be provided on the exterior of the vehicle 100. More particularly, the side camera 128 can be operatively connected to the exterior of one of the first lateral side 106 or the second lateral side 107 of the vehicle 100. In one or more arrangements, a side camera 128 can be mounted or otherwise provided on at least one of the wing mirrors 170 of the vehicle 100. An example of such an arrangement is shown in FIGS. 2 and 3. However, other locations are possible. For instance, the side camera can be operatively connected to a door or fender of the vehicle 100.

Referring to FIGS. 3-4, the side camera 128 can be at least partially enclosed within a cover 131. The cover 131 can be made of any suitable material. In one or more arrangements, the cover 131 can be at least partially transparent or translucent to allow the side camera 128 to capture visual data through the cover 131. In one or more arrangements, the cover 131 can include one or more apertures (not shown). The side camera 128 can be movable to a position to allow the side camera 128 to capture visual data through the one or more apertures. The cover 131 can be attached to a portion of the wing mirror 170 (e.g. the housing 180) in any suitable manner. For instance, the cover 131 can be attached to the housing 180 of the wing mirror 170 by, for example, one or more fasteners, one or more adhesives, one or more forms of mechanical engagement, one or more forms of mechanical engagement, and/or any combination thereof.

Referring again to FIG. 1, the vehicle 100 can include an input system 130 for receiving an input from a vehicle occupant (e.g. a driver or a passenger). An input may be received in any suitable form. Any suitable input system 130 can be used, including, for example, a keypad, display, touch screen, multi-touch screen, button, joystick, mouse, trackball, microphone and/or combinations thereof.

The vehicle 100 can include an output system 135 for presenting information to a vehicle occupant. The output system 135 can include one or more displays. A "display" is defined as a component or a group of components that present data in visual form. Alternatively or in addition, the output system 135 may include a microphone, earphone and/or speaker. Some components of the vehicle 100 may serve dual purposes such that the component is both a component of the input system 130 and a component of the output system 135. Examples of some of the possible element of the output system 135 will be described below.

The output system 135 can include one or more forward displays 140. "Forward display" means a display located in a front interior portion of a vehicle. "Front interior portion" means any part of the interior of a vehicle that is located from the forward facing side of the driver's seat and forward thereof in the longitudinal direction. As an example, the forward display 140 can be included in a dashboard or instrument panel (not shown) of the vehicle 100. As a further example, the forward display 140 can be any suitable surface in the front interior portion of the vehicle 100 upon which visual data can be projected. In such case, the output system 135 can include one or more projectors.

The forward display 140 can be any suitable type of display. The forward display 140 can be any suitable type of display. For instance, the forward display 140 can be a liquid crystal display (LCD), a light emitting diode (LED) display or some other suitable display. In one or more arrangements, the forward display 140 can be a touch screen display or a multi-touch display. A touch screen can allow a user to engage or interact with one or more displayed elements, such as a graphical user interface (GUI), and/or other applications running on any vehicle system, including any of those described herein, through contact with the forward display 140. For example, a user may make selections and move a cursor by simply touching the forward display 140 via a finger or stylus.

The forward display 140 can assist a driver while maneuvering the vehicle 100, such as during forward or reverse parking. In such case, the forward display 140 can be operable to present visual data from the forward environment 205 or the rear environment 210 of the vehicle 100, such as visual data captured by the camera system 125. Such visual data can be presented in real-time on the forward display 140.

FIGS. 5 and 6 show an example of the forward display 140. In this example, the forward display 140 includes a central portion 141, a first lateral portion 142 and a second lateral portion 143. In one or more arrangements, the forward display 140 can be a single display. In such case, the central portion 141, the first lateral portion 142 and the second lateral portion 143 can be presented on the single display. In one or more of such arrangements, one or more markings can be used to visually separate the central portion 141, the first lateral portion 142 and the second lateral portion 143. As an example, the markings can be one or more lines physically or graphically presented on the forward display 140.

In one or more arrangements, the forward display 140 can be a plurality of displays. In one or more arrangements, the central portion 141, the first lateral portion 142 and the second lateral portion 143 can be presented on a respective one of the plurality of forward displays 140. The plurality of forward displays 140 can be substantially adjacent to each other, or one or more of the forward displays can be spaced from one or more of the other forward displays 140.

FIG. 5 shows visual data being presented on the forward display 140 from the rear environment 210 of the vehicle 100. In such case, visual data captured by the rear camera 127 can be presented on the central portion 141 of the forward display 140. Further, visual data captured by the side cameras 128 in the second position or other rear facing position can be presented on a respective one of the lateral portions 142, 143 of the forward display 140.

FIG. 6 shows visual data being presented on the forward display 140 from the forward environment 205 of the vehicle 100. In such case, visual data captured by the front camera 126 can be presented on the central portion 141 of the forward display 140. Further, visual data captured by the side cameras 128 in the first position or other forward-facing position can be presented on a respective one of the lateral portions 142, 143 of the forward display 140.

The multi-directional maneuvering assist module 115 can be configured to process data received from the sensor system 120 and/or the camera system 125 to identify objects in the forward and/or rear environments 205, 210 of the vehicle 100. Upon detection of an object, one or more alert indicators can be presented to the driver or other vehicle occupant. For instance, the alert indicator can be a graphical alert indicator 300. A graphical alert indicator 300 can be presented on the forward display 140 for at least some of the detected objects. The one or more graphical alert indicators 300 have any suitable form. FIGS. 5 and 6 show an arrangement in which the graphical alert indicators 300 are triangular symbols. The graphical alert indicators 300 can be presented in any suitable manner with respect to an object.

As an example, the graphical alert indicators 300 can be presented over a respective one of the detected objects presented on the forward display 140.

In some arrangements, the multi-directional maneuvering assist module 115 can assess whether a detected object is a hazard. For instance, the multi-directional maneuvering assist module 115 can analyze data about a detected object to identify the nature of the object. For instance, the multi-directional maneuvering assist module 115 can use computer vision or template matching. If the detected object is identified as a hazard, then a graphical alert indicator 300 can be presented for that object.

In one or more arrangements, the multi-directional maneuvering assist module 115 can be configured to determine an appropriate travel path for the vehicle 100. For example, based on data received from the sensor system 120 and/or the camera system 125, the multi-directional maneuvering assist module 115 can be configured to determine an appropriate path to park the vehicle 100. In such case, one or more graphical guides can be presented on the forward display(s) 140 to facilitate a driver during parking. For instance, the graphical guides can be parking lines (not shown). A parking line can be presented over visual data presented on the forward display(s) 140 for one or both lateral sides 106, 107 of the vehicle 100.

The output system 135 can include one or more audial indicators 150. "Audial indicator" means any element, device, component and/or system that can generate, produce, and/or provide an audial alert. "Audial alert" is any output that is perceptible to the human sense of hearing. The one or more audial indicators 150 can audibly alert a driver to the presence of an object detected in the forward environment 205 or the rear environment 210 of the vehicle 100. In one or more arrangements, a plurality of audial indicators 150 can be distributed about the vehicle 100. In such arrangements, an audial indicator 150 can be activated in a location in the vehicle 100 that generally corresponds to the location of an object detected in the surrounding exterior environment of the vehicle 100. For example, an audial indicator 150 can be activated on a right side of the vehicle 100 if an object is detected in the right forward side environment or the right rear side environment.

The audial indicators 150 can include one or more microphones, earphones and/or speakers. "Speaker" means one or more devices or components that produce sound in response to an audio signal input. Examples of speakers include, for example, electroacoustic transducers, sound chips, and sound cards. Each speaker can have one or more audio output channels (not shown) operatively connected thereto. "Audio output channel" means any suitable device, component or structure for carrying audio signals.

The vehicle 100 can include one or more vehicle systems 155. For instance, the vehicle 100 can include a transmission system 160. The transmission system 160 can include one or more mechanisms, devices, elements, components, systems, and/or combinations thereof, now known or later developed, configured to transmit mechanical power from the vehicle's engine/motor to the vehicle's wheels/tires. For instance, the transmission system 160 can include a gearbox, clutch, differential, drive shafts, and/or other elements. In arrangements where the transmission system 160 includes drive shafts, the drive shafts can include one or more axles that are configured to be coupled to the vehicle's wheels/tires.

It will of course be understood that the vehicle 100 can have other vehicle systems 155, including, for example, any of the following: a propulsion system, a braking system, a steering system, a throttle system, a signaling system and/or a navigation system, just to name a few possibilities. However, the vehicle 100 can include more, fewer, or different systems. It should be appreciated that although particular vehicle systems are separately defined, each or any of the systems or portions thereof may be otherwise combined or segregated via hardware and/or software within the vehicle 100.

Figure 7:
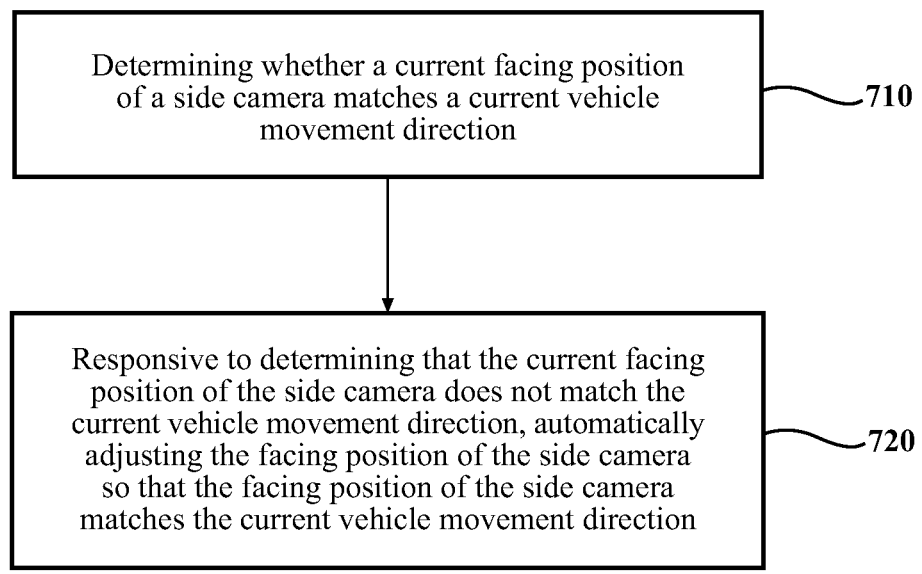
FIG. 7 is an example of a multi-directional maneuvering assistance method.

Now that the various potential systems, devices, elements and/or components of the vehicle 100 have been described, various multi-directional maneuvering assistance methods will now be described. Referring to FIG. 7, an example of another vehicle multi-directional maneuvering assistance method 700 is shown. Various possible steps of method 700 will now be described. The method 700 illustrated in FIG. 7 may be applicable to the embodiments described above in relation to FIGS. 1-6, but it is understood that the method 700 can be carried out with other suitable systems and arrangements. Moreover, the method 700 may include other steps, blocks and/or decision blocks that are not shown here, and in fact, the method 700 is not limited to including every step, block or decision block shown in FIG. 7. The steps, blocks and/or decision blocks that are illustrated here as part of the method 700 are not limited to this particular chronological order. Indeed, some of the steps, blocks and/or decision blocks may be performed in a different order than what is shown and/or at least some of the steps, blocks and/or decision blocks shown can occur simultaneously.

Various possible steps of method 700 will now be described. At block 710, it can be determined whether a current facing position of a side camera of the vehicle matches a current vehicle movement direction. Such a determination can be made in any suitable manner, such as, for example, by the processor(s) 105 and/or the multi-directional maneuvering assist module 115.

The current facing position of the side camera 128 can be determined in any suitable manner, such as by the one or more side camera facing position sensors 133. "Current vehicle movement direction" means the direction in which the vehicle 100 is actually moving or is enabled to move. As an example, the current vehicle movement direction can be determined to be forward if the vehicle 100 is actually moving in a forward direction. As another example, the current vehicle movement direction can be determined to be forward if the current transmission gear selection of the vehicle 100 is a forward gear (e.g. drive), regardless of whether the vehicle 100 is actually moving. For instance, the current vehicle movement direction can be determined to be forward if the current transmission gear selection is drive, but a brake of the vehicle 100 (e.g. a brake pedal or parking brake) is engaged such that the vehicle 100 does not actually move. As still another example, the current vehicle movement direction can be determined to be forward if the current transmission gear selection is neutral, but the vehicle 100 is actually moving in a forward direction, such as when the vehicle is being pushed or pulled or when the vehicle is rolling forward down an inclined surface.

As another example, the current vehicle movement direction can be determined to be reverse if the vehicle 100 is actually moving in a reverse direction. As a further example, the current vehicle movement direction can be determined to be reverse if the current transmission gear selection of the vehicle 100 is a backward gear (e.g. reverse), regardless of whether the vehicle 100 is actually moving. For instance, the current vehicle movement direction can be determined to be reverse if the current transmission gear selection is reverse, but a brake of the vehicle 100 (e.g. a brake pedal or parking brake) is engaged such that the vehicle 100 does not actually move. As still another example, the current vehicle movement direction can be determined to be forward if the current transmission gear selection is neutral, but the vehicle 100 is actually moving in a reverse direction, such as when the vehicle is being pushed or pulled or when the vehicle is rolling backward down an inclined surface. As still another example, the current vehicle movement direction can be park if the current transmission gear selection is park.

The current vehicle movement direction can be determined in any suitable manner. For instance, the current movement direction can be determined based on data received from the one or more vehicle movement direction sensors 119, the one or more transmission gear sensors 121, one or more other sensors of the sensor system 120 and/or the camera system 125.

The method 700 can continue to block 720. At block 720, responsive to determining that the current facing position of the side camera 128 does not match the current vehicle movement direction, the facing position of the side camera 128 can be automatically adjusted so that the facing position of the side camera 128 matches the current vehicle movement direction.

As an example, if the current vehicle movement direction is forward, the facing position of the side camera 128 can be adjusted so that it faces toward the forward environment 205 of the vehicle 100. As another example, if the current vehicle movement direction is backward, the facing position of the side camera 128 can be adjusted so that it faces toward the rear environment 210 of the vehicle 100. As a further example, if the current vehicle movement direction is park, the facing position of the side camera 128 can be adjusted so that it faces toward a respective lateral side environment 220, 225 of the vehicle 100.

The adjusting of the facing position of the side camera 128 can be performed automatically in response to the determination in decision block 710. Further, the adjusting of the facing position of the side camera 128 can be implemented in any suitable manner, such as by activating one or more of the actuators 129.

If the facing position of the side camera 128 matches the current vehicle movement direction, the method 700 can return to block 710, or the method 700 can end.

Figure 8:
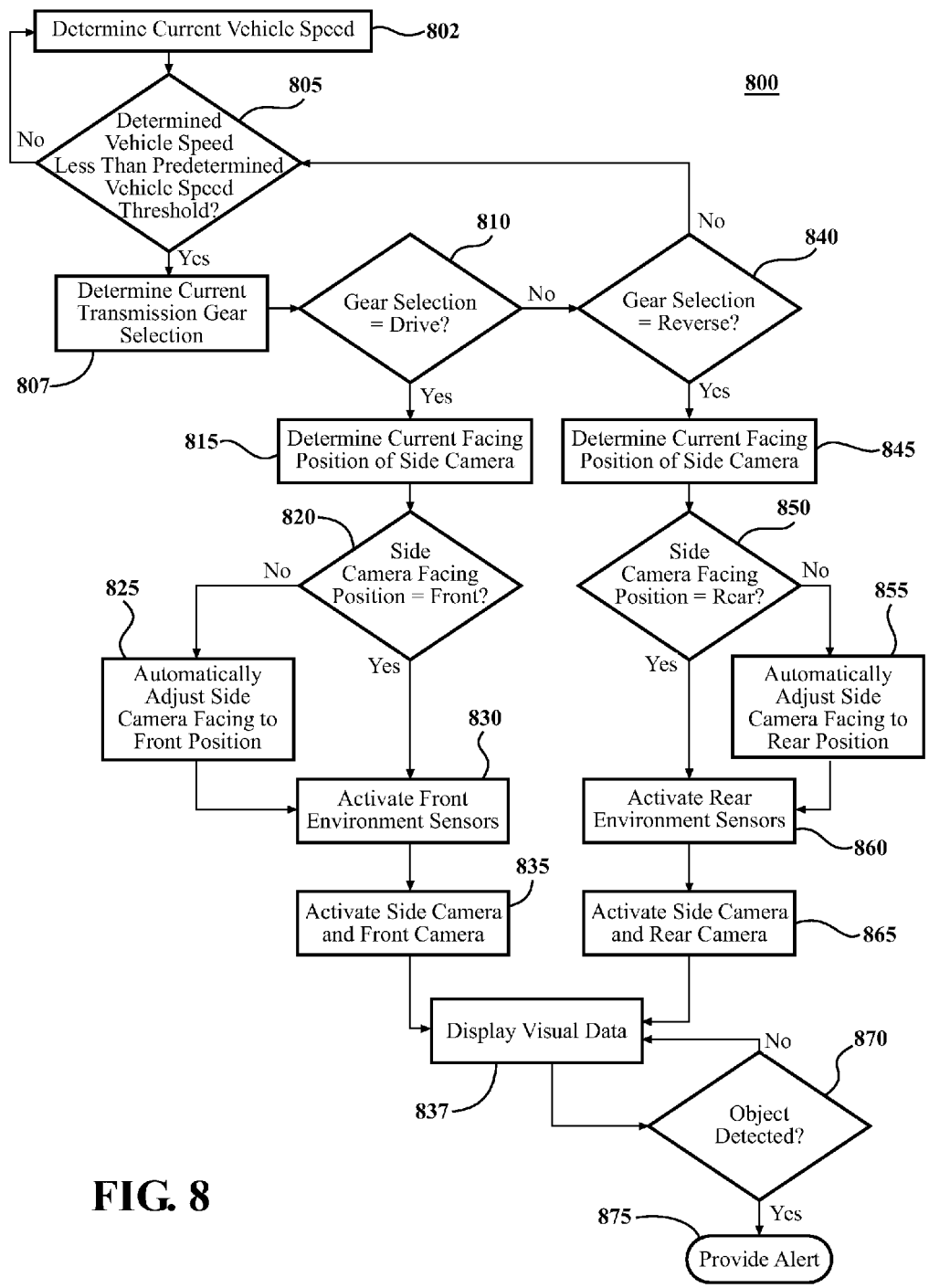
FIG. 8 is an example of a multi-directional maneuvering assistance method.

Referring to FIG. 8, an example of another vehicle multi-directional maneuvering assistance method 800 is shown. Various possible steps of method 800 will now be described. The method 800 illustrated in FIG. 8 may be applicable to the embodiments described above in relation to FIGS. 1-6, but it is understood that the method 800 can be carried out with other suitable systems and arrangements. Moreover, the method 800 may include other steps, blocks and/or decision blocks that are not shown here, and in fact, the method 800 is not limited to including every step, block or decision block shown in FIG. 8. The steps, blocks and/or decision blocks that are illustrated here as part of the method 800 are not limited to this particular chronological order. Indeed, some of the steps, blocks and/or decision blocks may be performed in a different order than what is shown and/or at least some of the steps, blocks and/or decision blocks shown can occur simultaneously.

Various possible steps of method 800 will now be described. At block 802, the current speed of the vehicle 100 can be determined. Such a determination can be performed in any suitable manner. For instance, the current speed of the vehicle 100 can be determined using the vehicle speed sensor(s) 122.

At decision block 805, the determined current speed of the vehicle 100 can be compared to a predetermined vehicle speed threshold. The processor 105, the multi-directional maneuvering assist module 115 and/or other element of the vehicle 100 can be configured to compare the determined current speed of the vehicle 100 to a predetermined vehicle speed threshold. The predetermined vehicle speed threshold can be any suitable value. As an example, the predetermined speed threshold can be about 5 miles per hour (mph) or less, about 10 mph or less, or about 15 mph or less, just to name a few possibilities.

If the determined current vehicle speed is less than the predetermined vehicle speed threshold, the method 800 can continue to block 807. If the current vehicle speed is greater than the predetermined vehicle speed threshold, the method 800 can return to block 802, or the method 800 can end.

While not shown in FIG. 8, it should be noted that, in some instances, a driver may input a command to initiate the vehicle multi-directional maneuvering assistance method 800. If such a command is received, the method 800 can continue to block 807 responsive to receiving a driver command, regardless of the current vehicle speed. The driver command may be received in any suitable manner, such as by the input system 130.

At block 807, the current transmission gear selection of the vehicle 100 can be determined. The method can continue to decision block 810. At decision block 810, if the determined current transmission gear selection is determined to be drive (that is, any forward gear), the method 800 can continue to block 815. If the determined current transmission gear selection is not drive (that is, any gear other than a forward gear), the method 800 can continue to decision block 840.

At decision block 840, if the determined current transmission gear selection is reverse, the method 800 can continue to block 845. If the determined current transmission gear selection is non-reverse (that is, any gear other than reverse), the method 800 can return to block 805, block 802, or the method 800 can end.

At block 815, the current facing position of the side camera 128 can be determined. Such a determination can be performed for each side camera 128 provided on the vehicle 100. The determination can be performed by the sensor system 120, the processor 105 and/or the multi-directional maneuvering assist module 115. While the following description of the method 800 may be described in terms of a single side camera 128, it will be understood that there can be more than one side camera 128, and the description herein applies equally to the plurality of side cameras 128. The method 800 can continue to decision block 820.

At decision block 820, it can be determined whether the determined facing position of the side camera 128 matches the current transmission gear selection. "Matches the current transmission gear selection" means that the side camera faces in the same direction as the travel direction of the vehicle based on the current transmission gear selection. Thus, with respect to decision block 820, the current transmission gear selection is drive, so the facing position of the side camera 128 matches the current transmission gear selection when the side camera 128 faces toward the forward environment 205.

If the determined facing position of the side camera 128 matches the current transmission gear selection (e.g. the side camera 128 is facing toward the forward environment 205), the method 800 can continue to block 830. If the determined facing position of the side camera 128 does not match the current transmission gear selection (e.g. the side camera 128 is facing toward the rear environment 210), the method 800 can continue to block 825.

At block 825, the facing position of the side camera 128 can be adjusted so that the facing position of the side camera matches the current transmission gear selection. The facing position of the side camera 128 can be adjusted so that it faces toward the forward environment 205 of the vehicle 100. The adjusting of the facing position of the side camera 128 can be performed automatically in response to the determination in decision block 820. Further, the adjusting of the facing position of the side camera 128 can be implemented in any suitable manner, such as by activating one or more of the actuators 129. If the facing position of the side camera 128 matches the current transmission gear selection, the method 800 can continue to block 830.

At block 830, the forward environment 205 can be detected for the presence of one or more objects in the forward environment 205. The detecting of the forward environment 205 can be performed by one or more sensors of the sensor system 120, such as the front environment sensor(s) 123. In some arrangements, the detecting of the forward environment 205 can be performed continuously. In some arrangements, the detecting of the forward environment 205 can be performed at any suitable interval. In some arrangements, the detected objects can include all objects detected by the sensor system 120 in the forward environment 205 within the range of the sensor system 120 or some subset thereof. The method 800 can continue to block 835.

At block 835, the side camera 128 can be activated to capture visual data. The facing position of the side camera 128 is toward the forward environment 205, so the side camera 128 can capture visual data from the respective portion of the forward environment 205 (e.g. the left forward side environment 206 or the right forward side environment 207). Alternatively or in addition, the front camera 126 can be activated to capture visual data from the forward environment 205. The method 800 can continue to block 837.

At block 837, visual data captured by the side camera 128 and/or the front camera 126 can be presented on the forward display 140. The method 800 can continue to decision block 870.

At decision block 870, it can be determined whether one or more objects are detected in the forward environment 205. If one or more objects are detected in the forward environment 205, the method 800 can continue to block 875. If no objects are detected in the forward environment 205, the method 800 can return to block 837 or other block or decision block of the method 800, or the method 800 can end.

Returning to decision block 840, if the determined current transmission gear selection is reverse, the method 800 can continue to block 845. At block 845, the current facing position of the side camera 128 can be determined. Such a determination can be performed for each side camera 128 provided on the vehicle 100. Again, while the following description of the method 800 may be described in terms of a single side camera 128, it will be understood that there can be more than one side camera 128, and the description herein applies equally to the plurality of side cameras 128. The method 800 can continue to decision block 850.

At decision block 850, it can be determined whether the determined facing position of the side camera 128 matches the current transmission gear selection. Here, the current transmission gear selection is reverse, so the facing position of the side camera 128 matches the current transmission gear selection when the side camera 128 faces toward the rear environment 210.

If the determined facing position of the side camera 128 matches the current transmission gear selection (e.g. the side camera 128 is facing toward the rear environment 210), the method 800 can continue to block 860. If the determined facing position of the side camera 128 does not match the current transmission gear selection (e.g. the side camera 128 is facing toward the forward environment 205), the method 800 can continue to block 855.

At block 855, the facing position of the side camera 128 can be adjusted so that the facing position of the side camera matches the current transmission gear selection. The facing position of the side camera 128 can be adjusted so that it faces toward the rear environment 210 of the vehicle 100. The adjusting of the facing position of the side camera 128 can be performed automatically in response to the determination in decision block 850. Further, the adjusting of the facing position of the side camera 128 can be implemented in any suitable manner, such as by activating one or more of the actuators 129. If the facing position of the side camera 128 matches the current transmission gear selection, the method 800 can continue to block 860.

At block 860, the rear environment 210 can be detected for the presence of one or more objects in the rear environment 210. The detecting of the rear environment 210 can be performed by one or more sensors of the sensor system 120, such as the rear environment sensor(s) 124. In some arrangements, the detecting of the rear environment 210 can be performed continuously. In some arrangements, the detecting of the rear environment 210 can be performed at any suitable interval. In some arrangements, the detected objects can include all objects detected by the sensor system 120 in the rear environment 210 within the range of the sensor system 120 or some subset thereof. The method 800 can continue to block 865.

At block 865, the side camera 128 can be activated to capture visual data. The facing position of the side camera 128 is toward the rear environment 210, so the side camera 128 can capture visual data from the respective portion of the rear environment 210 (e.g. the left rear side environment 211 or the right rear side environment 212). Alternatively or in addition, the rear camera 127 can be activated to capture visual data from the rear environment 210. The method 800 can continue to block 837. The above description of block 837 and block 875 applies equally here.

A non-limiting example of the above-described systems, methods and/or arrangements will be described in relation to FIGS. 2, 5 and 6. For purposes of this example, the vehicle 100 can be initially reverse parked in a garage. Subsequently, the vehicle 100 can be driven out of the garage. For purposes of this example, there can be a side camera 128 located on the first lateral side 106 of the vehicle 100, and there can be a side camera 128 located on the second lateral side 107 of the vehicle 100.

The vehicle 100 can be reversed parked into a garage. The driver can place the transmission system 160 of the vehicle 100 into reverse gear. The driver can back the vehicle 100 into the garage at a low speed. The current speed of the vehicle 100 can be determined, such as by the vehicle speed sensor 122. If the determined current speed of the vehicle 100 is below a predetermined vehicle speed threshold, the current transmission gear selection of the vehicle 100 can be determined, such as by the transmission gear sensor 121. As noted above, the current transmission gear selection is reverse.

The current facing position of the side cameras 128 can be determined, such as by the sensor system 120 (e.g. one or more side camera facing position sensors 133). If the side cameras 128 are determined to be facing the rear environment 210, then the facing position of the side cameras 128 matches the current transmission gear selection of the vehicle 100. In such case, the rear environment sensors 124, the rear camera 127 and the rear facing side cameras 128 can be activated. However, if the side cameras 128 are determined to be facing away from the rear environment 210 (e.g. facing toward the forward environment 205), then the facing position of the side cameras 128 does not match the current transmission gear selection of the vehicle 100. In such case, the facing position of the side cameras 128 can be automatically adjusted so that they face toward the rear environment 210, thereby matching the current transmission gear selection of the vehicle 100.

Visual data captured by the rear camera 127 and the rear facing side cameras 128 can be presented on the forward display 140. An example of the presentation of the visual data from the rear environment 210 is shown in FIG. 5. The presentation of visual data can be performed in real-time.

The visual data captured by the rear camera 127 and the rear facing side cameras 128 and/or the data collected by the rear environment sensors 124 can be processed by, for example, the multi-directional maneuvering assist module 115, the processor 105 and/or other element, system and/or component of the vehicle 100 to determine if an object is detected in the rear environment 210. If an object is detected, such an object can be highlighted on the forward display 140 by one or more graphical alert indicators 300, as shown in FIG. 5. In this example, the objects can include a tool chest 510 in the rear environment 210 and a storage container 520 in the left rear side environment 211. Upon detection of such objects, a respective graphical alert indicator 300 can be presented on the forward display 140, such as over at least a portion of the detected object.

In some instances, the audial indicator 150 can be activated. In one or more arrangements, the audial indicator 150 can be activated in a location generally corresponding to the location of the detected object. In the example shown in FIG. 5, the audial indicator 150 can be activated in a laterally central region and/or rear region of the vehicle 100 to alert the driver of the presence of the tool chest 510. Also, the audial indicator 150 can be activated in a left lateral region of the vehicle 100 and/or rear region of the vehicle 100 to alert the driver of the presence of the storage container 520.

Once the vehicle 100 is in a desired position, the driver may selectively place the transmission gear into park. The driver may exit the vehicle 100. Still another example in which the facing position of the side camera 128 matches the current vehicle gear is when the side camera 128 faces toward the lateral side environment 220, 225 and the current transmission gear selection is park. In such case, the side cameras 128 can be moved to the third position to provide views of the lateral side environments 220, 225 of the vehicle 100. Again, a driver can be alerted to the presence of objects detected in the lateral side environments 220, 225 by one or more graphical alert indicators 300 and/or one or more audial indicators 150. With such information, the driver or other vehicle occupant may exit the vehicle 100, potentially avoiding hitting anything located in the lateral side environments 220, 225 with a door of the vehicle 100.

Later, the driver may decide to travel somewhere using the vehicle 100. The driver can start the vehicle 100. The driver can placed the transmission system 160 of the vehicle 100 into a drive gear. The driver can depress the gas pedal to cause the vehicle 100 to move forward at a low speed to exit the garage.

The current speed of the vehicle 100 can be determined. If the determined current speed of the vehicle 100 is below a predetermined vehicle speed threshold, the current transmission gear selection of the vehicle 100 can be determined, such as by the transmission gear sensor 121. As noted above, the current transmission gear selection is drive. Thus, the travel direction is forward.

The current facing position of the side cameras 128 can be determined. In this example, the side cameras 128 will be in a rear facing position or a lateral facing position. As a result, the facing position of the side cameras 128 will not match the current transmission gear selection of the vehicle 100. The facing position of the side cameras 128 can be automatically adjusted so that they face toward the forward environment 205, thereby matching the current transmission gear selection of the vehicle 100.

The front environment sensors 123, the front camera 126 and the forward facing side cameras 128 can be activated. Visual data captured by the front camera 126 and the forward facing side cameras 128 can be presented on the forward display 140. An example of the presentation of the visual data from the forward environment 205 is shown in FIG. 6. The presentation of visual data can be performed in real-time.

The visual data captured by the front camera 126 and the forward facing side cameras 128 and/or the data collected by the rear environment sensors 124 can be processed by, for example, the multi-directional maneuvering assist module 115, the processor 105 and/or other element, system and/or component of the vehicle 100 to determine if an object is detected in the forward environment 205. If an object is detected, such an object can be highlighted on the forward display 140 by one or more graphical alert indicators 300, as shown in FIG. 6. In this example, the objects can include a ball 610 in the forward environment 205, a portion of the garage opening 620 in the right forward side environment 207, and a portion of the garage opening 630 in the left forward side environment 206. Upon detection of such objects, a respective graphical alert indicator 300 can be presented on the forward display 140, such as over at least a portion of the detected object.

In some instances, the audial indicator 150 can be activated. In one or more arrangements, the audial indicator 150 can be activated in a location generally corresponding to the location of the detected object. In the example shown in FIG. 6, the audial indicator 150 can be activated in a laterally central region and/or forward region of the vehicle 100 to provide an alert of the presence of the ball 610. Also, the audial indicator 150 can be activated in a right lateral region of the vehicle 100 and/or forward region of the vehicle 100 to provide an alert of the presence of the portion of the garage opening 620. Further, an audial indicator 150 can be activated in a left lateral region of the vehicle 100 and/or forward region of the vehicle 100 to provide an alert of the portion of the garage opening 630.

It should be noted that, in the above example and/or in other instances, the multi-directional maneuvering assistance described herein can be initiated by driver command. For instance, the driver can input such a command using the input system 130. Upon receiving such a command, the current transmission gear selection can be determined.

It will be appreciated that arrangements described herein can provide numerous benefits, including one or more of the benefits mentioned herein. For example, arrangements described herein can assist a driver across various transmission gear selections. Arrangements described herein can provide visual or proximity information and/or warnings to a driver with respect to objects in areas that may otherwise be difficult or impossible for the driver to see (e.g. left and/or right side environments 206, 207, 211, 212 and/or the lateral side environments 220, 225 of the vehicle 100). With such information, the likelihood of damaging or harmful contact between the vehicle 100 and objects external to the vehicle 100 can be reduced. Arrangements described herein can provide visual and/or audial alerts can help to focus a driver's to areas where attention may be needed. Arrangements described herein can increase confidence of driver while parking. Arrangements described herein can enhance the usefulness and/or usability of currently available vehicular parking assist systems.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle with a multi-directional maneuvering assistance system comprising:
   a vehicle having an exterior with a first lateral side and a second lateral side;
   one or more front cameras, the one or more front cameras configured to capture visual data from at least a portion of a forward environment of the vehicle;
   one or more rear cameras the one or more rear cameras configured to capture visual data from at least a portion of a rear environment of the vehicle;
   a first side camera provided on the first lateral side of the vehicle, the first side camera having a plurality of facing positions, the first side camera being configured to capture visual data from at least a portion of a first lateral side environment of the vehicle;
   a second side camera provided on the second lateral side of the vehicle, the second side camera having a plurality of facing positions, the second side camera being configured to capture visual data from at least a portion of a second lateral side environment of the vehicle;
   a forward display located in a front interior portion of a vehicle, the forward display including a central portion, a first lateral portion, and a second lateral portion, the first lateral portion of the forward display being located on a lateral side of the central portion corresponding to the first lateral side of the vehicle, the second lateral portion of the forward display being located on an opposite lateral side of the central portion corresponding to the second lateral side of the vehicle; and
   one or more processors located onboard the vehicle, the one or more processors being operatively connected to the forward display, the one or more front cameras, the one or more rear cameras, the first side camera, and the second side camera, the one or more processors being programmed to initiate executable operations comprising:
      responsive to determining that a current speed of the vehicle is less than a predetermined vehicle speed threshold, determining a current vehicle movement direction;
      determining whether a current facing position of the first side camera or the second side camera matches the current vehicle movement direction;
      responsive to determining that the current facing position of the first side camera or the second side camera does not match the current vehicle movement direction, automatically adjusting the facing position of the first side camera or the second side camera so that the facing position of the first side camera and the second side camera matches the current vehicle movement direction;
      causing the one or more front cameras or the one or more rear cameras to capture visual data from a respective one of the forward environment or the rear environment of the vehicle corresponding to the current vehicle movement direction;
      causing the first side camera to capture visual data from at least a portion of a first lateral side environment of the vehicle;
      causing the second side camera to capture visual data from at least a portion of a second lateral side environment of the vehicle; and
      presenting the captured visual data on the forward display of the vehicle, the visual data captured by the first side camera being presented on the first lateral portion of the forward display, the visual data captured by the second side camera being presented on the second lateral portion of the forward display, and the visual data captured by the one or more front cameras or the one or more rear cameras being presented on the central portion of the forward display.

2. The vehicle of claim 1, further including:
   a sensor system operable to selectively detect a forward lateral side environment and a rear lateral side environment of the vehicle for one or more objects located in the respective lateral side environment, the sensor system being operatively connected to the one or more processors, and wherein the executable operations further include:
      detecting at least a portion of the respective lateral side environment for one or more objects located in the respective lateral side environment; and
      responsive to detecting an object in the respective lateral side environment, providing an alert of the detected object.

3. The vehicle of claim 2, wherein the alert is a graphical alert indicator, and wherein the graphical alert indicator is presented on the forward display overlaid upon at least a portion of the detected object in the visual data presented on the forward display.

4. The vehicle of claim 2, wherein the alert is an audial indicator of the detected object, whereby one or more sounds is emitted to alert a driver of the presence of the detected object.

5. The vehicle of claim 1, wherein automatically adjusting the facing position of the first side camera or the second side camera includes activating an actuator operatively connected to rotate the first side camera or the second side camera about an axis.

6. The vehicle of claim 1, wherein when the current vehicle movement direction is determined based on a current transmission gear selection of the vehicle, and wherein when the current transmission gear selection is park, automatically adjusting the facing position of at least one of the first side camera or the second side camera so that the facing position of the first side camera or the second side camera is substantially perpendicular to a longitudinal axis of the vehicle.

7. The vehicle of claim 1, further including a first wing mirror located on the first lateral side of the vehicle and a second wing mirror located on the second lateral side of the vehicle, wherein the first side camera is mounted on the first wing mirror, and wherein the second side camera is mounted on the second wing mirror.

8. The vehicle of claim 1, wherein the facing position of the first side camera and the facing position of the second side camera are automatically adjusted independently of each other.

9. The vehicle of claim 1, wherein the forward display is a single display, and wherein the central portion, the first lateral portion, and the second lateral portion are presented on the single display.

10. The vehicle of claim 1, wherein the central portion is separated from the first lateral portion and the second lateral portion by at least one of:
one or more physical marking on the forward display, or
one or more graphical markings presented on the forward display.

11. The vehicle of claim 1, wherein the forward display includes a plurality of separate displays, wherein the central portion, the first lateral portion, and the second lateral portion are defined by a respective one of the plurality of separate displays.

12. A multi-directional maneuvering assistance method for a vehicle, the vehicle having an exterior with a first lateral side and a second lateral side, the vehicle including a side camera provided on the first lateral side, the side camera being movable between a plurality of facing positions, the vehicle including a forward display located in a front interior portion of the vehicle, the forward display including a central portion and a first lateral portion, the first lateral portion being located on a lateral side of the central portion corresponding to the first lateral side of the vehicle, the method comprising:
determining a current transmission gear selection of the vehicle;
determining a facing position of the side camera;
if the current transmission gear selection of the vehicle is drive, automatically adjusting the facing position of the side camera so that the facing position of the side camera matches the current transmission gear selection;
if the current transmission gear selection of the vehicle is reverse, automatically adjusting the facing position of the side camera so that the facing position of the side camera matches the current transmission gear selection;
if the current transmission gear selection of the vehicle is park, automatically adjusting the facing position of the side camera so that the facing position of the side camera is substantially perpendicular to a longitudinal axis of the vehicle;
causing the side camera to capture visual data from at least a portion of a first lateral side environment of the vehicle; and
presenting the visual data captured by the side camera on the first lateral portion of the forward display.

13. The method of claim 12, further including:
determining a current speed of the vehicle; and
comparing the determined current speed of the vehicle to a predetermined vehicle speed threshold,
wherein determining the current transmission gear selection of the vehicle is performed responsive to determining that the determined current speed of the vehicle is less than the predetermined vehicle speed threshold.

14. The method of claim 12, further including:
acquiring sensor data of a portion of an external environment of the vehicle in a direction corresponding to the current transmission gear selection, the portion of the external environment including at least a portion of the first lateral side environment of the vehicle;
detecting whether there is an object in the portion of the external environment based on the acquired sensor data; and
responsive to detecting an object in the portion of the external environment, presenting an alert of the detected object.

15. The method of claim 14, wherein the alert is a graphical alert indicator, and wherein the graphical alert indicator is presented on the forward display overlaid upon at least a portion of the detected object in the visual data presented on the forward display.

16. The method of claim 14, wherein the alert is an audial indicator of the detected object, whereby one or more sounds is emitted to alert a driver of the presence of the detected object.

17. The method of claim 12, wherein the vehicle includes one or more front cameras and one or more rear cameras, wherein the one or more front cameras are configured to capture visual data from at least a portion of a forward environment of the vehicle, wherein the one or more rear cameras are configured to capture visual data from at least a portion of a rear environment of the vehicle, and wherein the method further includes:
causing the one or more front cameras or the one or more rear cameras to capture visual data from a respective one of the forward environment or the rear environment of the vehicle corresponding to the current transmission gear selection of the vehicle; and
presenting the visual data captured by the one or more front cameras or the one or more rear cameras on the central portion of the forward display,
whereby, if the current transmission gear selection of the vehicle is drive, the visual data captured by the one or more front cameras is presented on the central portion of the forward display, and
whereby, if the current transmission gear selection of the vehicle is reverse, the visual data captured by the one or more rear cameras is presented on the central portion of the forward display.

18. A multi-directional maneuvering assistance system for a vehicle, the vehicle having an exterior with a first lateral side and a second lateral side, the system comprising:

a first side camera provided on the first lateral side of the vehicle, the first side camera having a plurality of facing positions, the first side camera being configured to capture visual data from at least a portion of a first lateral side environment of the vehicle;

a forward display located in a front interior portion of a vehicle, the forward display including a central portion and a first lateral portion, the first lateral portion being located on a lateral side of the central portion corresponding to the first lateral side of the vehicle; and one or more processors, the one or more processors being operatively connected to the forward display and the first side camera, the one or more processors being programmed to initiate executable operations comprising:

determine a current transmission gear selection of the vehicle;

determine a facing position of the first side camera;

if the current transmission gear selection of the vehicle is drive, automatically adjust the facing position of the first side camera so that the facing position of the first side camera matches the current transmission gear selection;

if the current transmission gear selection of the vehicle is reverse, automatically adjust the facing position of the first side camera so that the facing position of the first side camera matches the current transmission gear selection;

if the current transmission gear selection of the vehicle is park, automatically adjust the facing position of the first side camera so that the facing position of the first side camera is substantially perpendicular to a longitudinal axis of the vehicle;

cause the first side camera to capture visual data from at least a portion of a first lateral side environment of the vehicle; and present the visual data captured by the first side camera on the first lateral portion of the forward display.

19. The system of claim 18, wherein the executable operations further include:

determine a current speed of the vehicle; and compare the determined current speed of the vehicle to a predetermined vehicle speed threshold, wherein determining the current transmission gear selection of the vehicle is performed responsive to determining that the determined current speed of the vehicle is less than the predetermined vehicle speed threshold.

20. The system of claim 18, further including:

one or more front cameras, the one or more front cameras configured to capture visual data from at least a portion of a forward environment of the vehicle; and one or more rear cameras, the one or more rear cameras configured to capture visual data from at least a portion of a rear environment of the vehicle, wherein the one or more processors being operatively connected to the one or more front cameras and the one or more rear cameras, wherein the executable operations further include:

cause the one or more front cameras or the one or more rear cameras to capture visual data from a respective one of the forward environment or the rear environment of the vehicle corresponding to the current transmission gear selection of the vehicle; and present the visual data captured by the one or more front cameras or the one or more rear cameras on the central portion of the forward display, whereby, if the current transmission gear selection of the vehicle is drive, the visual data captured by the one or more front cameras is presented on the central portion of the forward display, and whereby, if the current transmission gear selection of the vehicle is reverse, the visual data captured by the one or more rear cameras is presented on the central portion of the forward display.

* * * * *